United States Patent
Na et al.

(10) Patent No.: US 9,967,552 B2
(45) Date of Patent: May 8, 2018

(54) DISPLAY APPARATUS AND TOUCH PANEL

(71) Applicant: SAMSUNG ELECTRONICS CO., LTD., Suwon-si (KR)

(72) Inventors: In-hak Na, Anyang-si (KR); Ki-hyung Kang, Suwon-si (KR); Soo-bae Moon, Suwon-si (KR); Jung-hoon Yoon, Seongnam-si (KR); Hyun-seung Cho, Anyang-si (KR); Seon-deok Hwang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 835 days.

(21) Appl. No.: 14/306,779

(22) Filed: Jun. 17, 2014

(65) Prior Publication Data

US 2014/0368624 A1    Dec. 18, 2014

(30) Foreign Application Priority Data

Jun. 17, 2013    (KR) .......................... 10-2013-0069287

(51) Int. Cl.
| | |
|---|---|
| H04N 13/04 | (2006.01) |
| G02B 27/26 | (2006.01) |
| G02B 27/22 | (2018.01) |
| G06F 3/041 | (2006.01) |

(52) U.S. Cl.
CPC ..... *H04N 13/0409* (2013.01); *G02B 27/2214* (2013.01); *G02B 27/26* (2013.01); *G06F 3/041* (2013.01)

(58) Field of Classification Search
None
See application file for complete search history.

(56) References Cited

U.S. PATENT DOCUMENTS

| | | | | |
|---|---|---|---|---|
| 6,055,103 | A  * | 4/2000 | Woodgate | ............ G02B 5/3016 |
| | | | | 348/E13.022 |
| 7,050,020 | B2 | 5/2006 | Uehara et al. | |
| 7,058,252 | B2 | 6/2006 | Woodgate et al. | |
| 8,885,018 | B2 | 11/2014 | Smith et al. | |

(Continued)

FOREIGN PATENT DOCUMENTS

| | | |
|---|---|---|
| CN | 1539095 A | 10/2004 |
| CN | 101299103 A | 11/2008 |

(Continued)

OTHER PUBLICATIONS

Communication, dated Apr. 11, 2014, issued by the European Patent Office in counterpart European Application No. 14157481.4.

(Continued)

*Primary Examiner* — Kevin McInnish
(74) *Attorney, Agent, or Firm* — Sughrue Mion, PLLC

(57) ABSTRACT

A display apparatus includes a display panel configured to display an image frame that includes a right-eye image and a left-eye image, and a touch panel configured to sense a user touch, wherein the touch panel includes a polarizing switch panel configured to switch a direction of polarization of light emitted from the display panel, and a parallax realization layer which is formed on one side of the polarizing switch panel and is configured to provide a binocular disparity image by using light emitted from the polarizing switch panel.

14 Claims, 12 Drawing Sheets

(56) References Cited

U.S. PATENT DOCUMENTS

| | | | |
|---|---|---|---|
| 2004/0041747 A1 | 3/2004 | Uehara et al. | |
| 2004/0240777 A1 | 12/2004 | Woodgate et al. | |
| 2010/0110040 A1* | 5/2010 | Kim | G06F 3/0412 345/174 |
| 2010/0309204 A1 | 12/2010 | Smith et al. | |
| 2011/0074729 A1* | 3/2011 | Im | G06F 3/0412 345/174 |
| 2011/0216037 A1 | 9/2011 | Kang et al. | |
| 2012/0026159 A1 | 2/2012 | Seok et al. | |
| 2012/0182488 A1 | 7/2012 | Kuwajima et al. | |
| 2012/0229421 A1 | 9/2012 | Kim et al. | |
| 2013/0050416 A1* | 2/2013 | Iwasaki | G02B 27/2214 348/43 |
| 2016/0224163 A1 | 8/2016 | Kim et al. | |
| 2016/0224188 A1 | 8/2016 | Kim et al. | |

FOREIGN PATENT DOCUMENTS

| | | | |
|---|---|---|---|
| CN | 101498841 A | 8/2009 | |
| CN | 101937662 A | 1/2011 | |
| CN | 101971237 A | 2/2011 | |
| CN | 102413340 A | 4/2012 | |
| CN | 202183086 U | 4/2012 | |
| CN | 202351566 U | 7/2012 | |
| CN | 102692756 A | 9/2012 | |
| CN | 102782621 A | 11/2012 | |
| CN | 103116233 A | 5/2013 | |
| GB | 2 457 691 A | 8/2009 | |
| GB | 2457691 A * | 8/2009 | G02B 27/2214 |

OTHER PUBLICATIONS

Communication dated Jan. 19, 2017, issued by the State Intellectual Property Office of P.R. China in counterpart Chinese Application No. 201410270183.9.

Communication issued Sep. 12, 2017 by the State Intellectual Property Office of P.R. China in counterpart Chinese Patent Application No. 201410270183.9.

Communication dated Mar. 6, 2018, by the State Intellectual Property Office of People's Republic China in counterpart Chinese Application No. 201410270183.9.

\* cited by examiner

- RP : Rendering pitch
- OV : Object view (stereo-view = 2)
- P2 : Barrier or Lens pitch
- L3 : (L2+L3) = P2 : RP*OV
- L2 = L3(RP*OV-P2)/P2

DISPLAY APPARATUS AND TOUCH PANEL

CROSS-REFERENCE TO RELATED APPLICATION

This application claims priority from Korean Patent Application No. 10-2013-0069287, filed on Jun. 17, 2013 in the Korean Intellectual Property Office, the disclosure of which is incorporated herein by reference in its entirety.

BACKGROUND

1. Technical Field

Apparatuses consistent with exemplary embodiments relate to a display apparatus and a touch panel, more particularly to a display apparatus using an optical apparatus and a touch panel and the touch panel.

2. Description of the Related Art

A three-dimensional (3D) display apparatus enables watching of 3D images displayed on a screen. The 3D display apparatus may be a system with glasses or a system without glasses.

As an example of the system with glasses, there is a display apparatus with a shutter glass type, meaning that left-eye images and right-eye images are alternatively output, and in connection with this, left and right shutter glasses of 3D glasses of a user are alternatively opened and closed so that a user may perceive a 3D effect.

The system without glasses is also called as an autostereoscopic. A 3D display apparatus without glasses, while displaying multi-view images shifted spatially, projects light corresponding to images of different images of a user's left eye and right eye, by using parallax barrier technology or a lenticular lens so that a user may perceive the 3D effect.

The system without glasses has an advantage that a user may view 3D images without using glasses.

In particular, autostereoscopic display methods has been distributed and applied to medium and small size devices, and requirements on thickness and power in medium and small size devices have been bolstered.

When applying a parallax barrier or a lenticular lens for a device including a touch panel, thickness has been increased by as much as thickness of the parallax barrier or the lenticular lens, increasing entire thickness of the device.

FIG. 1 is a view illustrating a liquid crystal display (LCD) 110, an optical layer 120 including a lenticular lens, and a glass-glass (GG)-type touch screen panel 130 (hereinafter, a touch panel) and combination thereof.

According to FIG. 1, an optical layer 120 including the lenticular lens is interposed between the LCD 110 the GG-type touch panel 130. In order to display a 3D image without glasses, the optical layer 120 including a lenticular lens or a parallax barrier needs to be provided. However, if the optical layer 120 is provided, the device becomes thicker by as much as thickness of the optical layer 120.

SUMMARY

One or more exemplary embodiments provide a display apparatus and a touch panel thereof having a thin thickness by using a touch panel including a parallax realization layer whose thickness and location are changed.

According to an aspect of an exemplary embodiment, there is provided a display apparatus, including a display panel configured to display an image frame that includes a right-eye image and a left-eye image, and a touch panel configured to sense a user touch, wherein the touch panel includes a polarizing switch panel configured to switch a direction of polarization of light emitted from the display panel, and a parallax realization layer which is formed on one side of the polarizing switch panel and is configured to provide a binocular disparity image by using light emitted from the polarizing switch panel.

The display apparatus may further include a video processor configured to generate an image frame by combining a right-eye image and a left-eye image.

A thickness of the parallax realization layer may be determined by $$L2 = L3*(RP*OV - P2)/P2,$$

where L2 indicates a length between the display panel and the parallax realization layer, L3 indicates a distance for forming a 3D image, RP indicates a rendering pitch, OV indicates an object view, and P2 indicates a barrier or a lens pitch.

The touch panel may be a glass-glass (GG) type touch panel including a glass layer and a tempered glass layer that are sequentially-layered, wherein the polarizing switch panel and the parallax realization layer may be embedded in the glass layer or the tempered glass layer.

The touch panel may be a glass/film GF2 type touch panel including a polyethylene terephthalate (PET) film and a tempered glass layer that are sequentially-layered, wherein the polarizing switch panel and the parallax realization layer may be embedded in the tempered glass layer.

The touch panel may further include at least one glass layer, wherein the polarizing switch panel and the parallax realization layer may be embedded in the glass layer.

The video processor may be further configured to divide the left-eye image into a plurality of left-eye image lines, divide the right-eye image into a plurality of right-eye image lines, and generate the image frame by alternately combining the plurality of left-eye image lines and the plurality of right-eye image lines to minimize an area where the left-eye image and the right-eye image are mixed.

The touch panel may be at least one of a GG type touch panel, a G1 type touch panel, a G2 type touch panel, a GFF type touch panel, a GF1 type touch panel, a GF2 type touch panel, an ON-CELL type touch panel, and an IN-CELL type touch panel.

According to an aspect of another exemplary embodiment, there is provided a touch panel including a polarizing switch panel configured to switch a direction of polarization of light emitted from a display panel that is configured to display an image frame including a right-eye image and a left-eye image that are combined, and a parallax realization layer which is formed on one side of the polarizing switch panel and is configured to provide a binocular disparity image using light emitted from the polarizing switch panel.

The thickness of the parallax realization layer may be determined by $$L2 = L3*(RP*OV - P2)/P2,$$

where L2 indicates a length between the display panel and the parallax realization layer, L3 indicates a distance for forming a 3D image, RP indicates a rendering pitch, OV indicates an object view, and P2 indicates a barrier or a lens pitch.

The touch panel may be a glass-glass (GG) type touch panel including a glass layer and a tempered glass layer that are sequentially-layered, and wherein the polarizing switch panel and the parallax realization layer may be embedded in at least one of the glass layer and the tempered glass layer.

The touch panel may be a glass/film GF2 type touch panel including a polyethylene terephthalate (PET) film and a tempered glass layer that are sequentially-layered, wherein the polarizing switch panel and the parallax realization layer may be embedded in the tempered glass layer.

The touch panel may further include at least one glass layer, wherein the polarizing switch panel and the parallax realization layer may be embedded in the glass layer.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
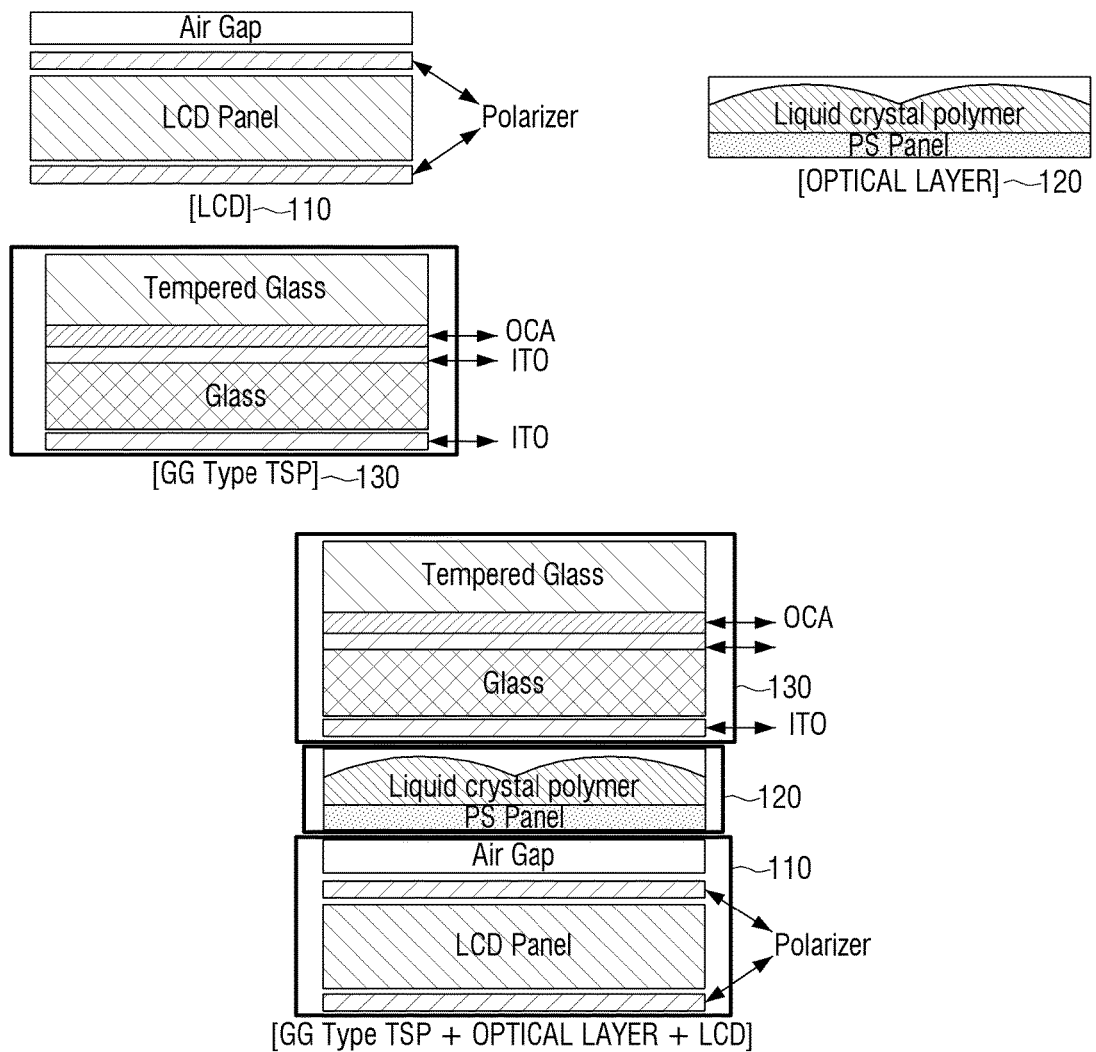
FIG. 1 is a view illustrating an LCD, an optical layer, a touch panel and combination of thereof according to the related art.

Certain exemplary embodiments will be described in detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail because they may obscure the application with unnecessary detail.

Figure 2A:
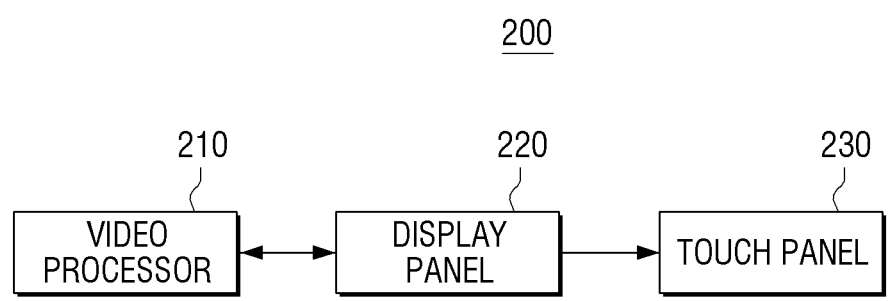
FIG. 2A is a block diagram illustrating a configuration of the display apparatus according to an exemplary embodiment.

FIG. 2A is a block diagram illustrating a configuration of a display apparatus according to an exemplary embodiment.

According to FIG. 2A, display apparatus 200 includes a video processor 210, a display panel 220, and a touch panel 230. Herein, the display apparatus 200 may display a two-dimensional (2D) image or a 3D image. A display apparatus displaying the 3D image is the apparatus which displays 3D content so that a user may perceive a 3D effect. Various apparatuses such as a television (TV), monitor, personal computer (PC), mobile phone, lap top computer, tablet PC, electronic frame, electronic book, personal digital assistant (PDA) may be embodied as 3D display apparatuses.

Such 3D display apparatuses utilize a stereoscopic display method or an autostereoscopic display method, wherein the stereoscopic display method is a 3D display method using glasses, while the autostereoscopic display method is a 3D display method without using glasses.

Specifically, autostereoscopic display methods are embodied with a method of realizing 3D images by using a parallax barrier, realizing 3D image as a holograph display, realizing 3D image by displaying voxel in a real space based on physical structure such as rotation, and realizing 3D image by using the phenomenon that air becomes plasma at the point where laser beam is concentrated, etc.

Herein, the method of realizing 3D image by using a parallax barrier includes a parallax barrier method which makes received images different by installing a special slit in front of a display panel to produce images which a left eye and a right eye can view differently, and a method using lenticular lens by refracting light with a cylinder type lens so that the left eye and the right eye may view different images.

Further, there is a method of using a cylinder shape such as a lenticular lens which uses a liquid crystal lens so that the left eye and the right eye may view different images.

The video processor 210 may generate an image frame by combining a right eye image and a left eye image. Herein, the left-eye image and the right-eye image indicate the same subjects photographed at a different angle. That is, by photographing subjects which are separated as much as the distance between left eye and right eye of a user, an image has disparity.

In addition, the video processor 210 may generate one image frame by combining a left-eye image and a right-eye image by alternately inserting the left-eye image and the right-eye image in the display panel 220 in a unit of a pixel, and generate one image frame where a left-eye image and a right-eye image are combined.

Specifically, the video processor 210 may generate one frame by combining a plurality of sub pixels composing a pixel of a left-eye image and a plurality of sub pixels composing a pixel of a right-eye image.

The display panel 220 may display an image frame where the above-described right-eye image and left-eye image are combined. Specifically, the display panel 220 may output a multi-view image. The multi-view image is an image where the images composed of same subjects photographed at different angles are combined. For example, a left-eye image and a right-eye image may be alternately and repeatedly disposed and constitute one image frame. Alternatively, four or more images may be combined and constitute one image frame. The multi-view image may be provided from an external source such as a broadcasting station or a web server, or from an internal/external storage and a display, etc.

Moreover, the display panel 220 displays a plurality of pixels, which may include a left-eye pixel and a right-eye pixel.

The display panel 220 may be embodied with various color liquid crystal displays. For example, it may be embodied as a color LCD. Herein, an LCD is an apparatus which displays an image by using properties of liquid crystal which causes change in arrangement of particles when voltage is applied. After injecting liquid crystal into a narrow grove between two glass substrates, the arrangement of particles of liquid crystal is changed through a transparent electrode. By using changes in optical refraction, this apparatus displays characters or images. Further explanations will be omitted.

The touch panel 230 may sense a user touch.

The touch panel 230 may be a transparent switch panel which may receive touch inputs to control an apparatus by combining the touch panel with an LCD. It may be embodied as an optical type using infrared rays, a transparent electrode type using electric contact of transparent film where indium tin oxide (ITO) is coated on a polyester film, a transparent conductive film where a stainless steel wire is inserted into a transparent conductive film, a capacitance type to detect changes in capacitance, and detecting location by using a pressure sensor disposed around a panel to sense pressure of the touch.

The touch panel 230 may be formed on a polarizing switch panel or on one side of the polarizing switch panel to switch the direction of polarization of light emitted from the display panel 220, and may include parallax realization layer which provides a binocular disparity image by using light emitted from a polarizing switch panel.

Herein, the polarizing switch panel is a panel equipped with a light switch which may change a polarized surface by 90°. By applying voltage (half-wave voltage) where a difference of optical phase between two polarized lights orthogonally connected to each other at a light modulator using electric optical effect changes as much as π radian, a polarized surface of the modulator may be changed by 90° regarding the input polarized light.

In addition, a parallax realization layer, while displaying multi-view images shifted spatially, generates light corresponding to images of different images of a user's left eye and right eye projected, by using the parallax barrier technology or a lenticular lens so that a user may perceive the three-dimensional effect.

In particular, parallax realization layer may be composed of a lenticular lens which divide and emit light projected from a backlight unit into a left-eye visual field and a right-eye visual field.

That is, the display apparatus 200, by using a parallax realization layer, refracts a plurality of images photographed at different point of views as different angles, and provides focused images at a location distant as much as the viewing distance. The location where such image is formed is called the viewing area. Accordingly, when one eye of a user is located in the first viewing area, and another eye is located in the second viewing area, the user may perceive a three dimensional effect. Here, the pre-determined distance may be changed by size of a lenticular lens, a curvature, a refractive index, and an optical parameter which will be described later.

Figure 2B:
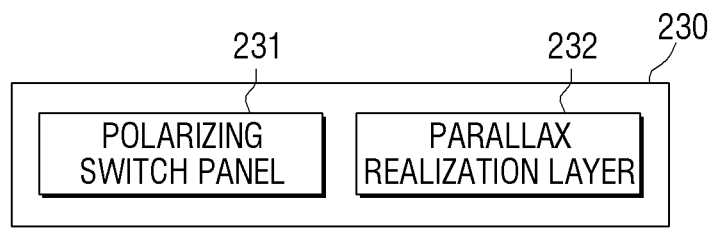
FIG. 2B is a block diagram illustrating a touch panel including a polarizing switch panel and a parallax realization layer according to an exemplary embodiment.

FIG. 2B is a block diagram illustrating a touch panel including a polarizing switch panel and a parallax realization layer.

Referring to FIG. 2B, the touch panel 230 includes a polarizing switch panel 231 and on one side of the a polarizing switch panel 231 to switch direction of polarized light emitted from the display panel which displays an image frame where a right-eye image and a left-eye image are combined. The parallax realization layer 232 which provides a binocular disparity image using light emitted from the polarized switch panel may be included.

Herein, the polarizing switch panel 231 is a panel equipped with a light switch which may change polarized surface by 90°. By adding voltage (half-wave voltage) where difference of optical phase between two polarized lights orthogonally connected to each other at a light modulator using electric optical effect changes as much as π radian, polarized surface of the modulator may be changed by 90° regarding the input polarized light.

In addition, parallax realization layer 232, while displaying multi-view images shifted spatially, makes light corresponding to images of different images of a user's left eye and right eye projected, by using the parallax barrier technology or lenticular lens so that a user may perceive the three-dimensional effect.

In particular, parallax realization layer 232 may be composed of lenticular lens which divide and emit light projected from backlight unit into left-eye visual field and right-eye visual field.

The structure and method about how the touch panel 230 comprises the polarizing switch panel 231 and the parallax realization layer 232 will be described later.

For the touch panel 230 to include the polarizing switch panel 231 and the parallax realization layer 232, that is, for the polarizing switch panel 231 and the parallax realization layer 232 to be embedded in the touch panel 230, a thickness of the parallax realization layer 232 needs to be controlled to become thinner.

Herein below, according to an exemplary embodiment, the principle of changing thickness of the parallax realization layer 232 will be further described in view of the drawings.

Figure 3:
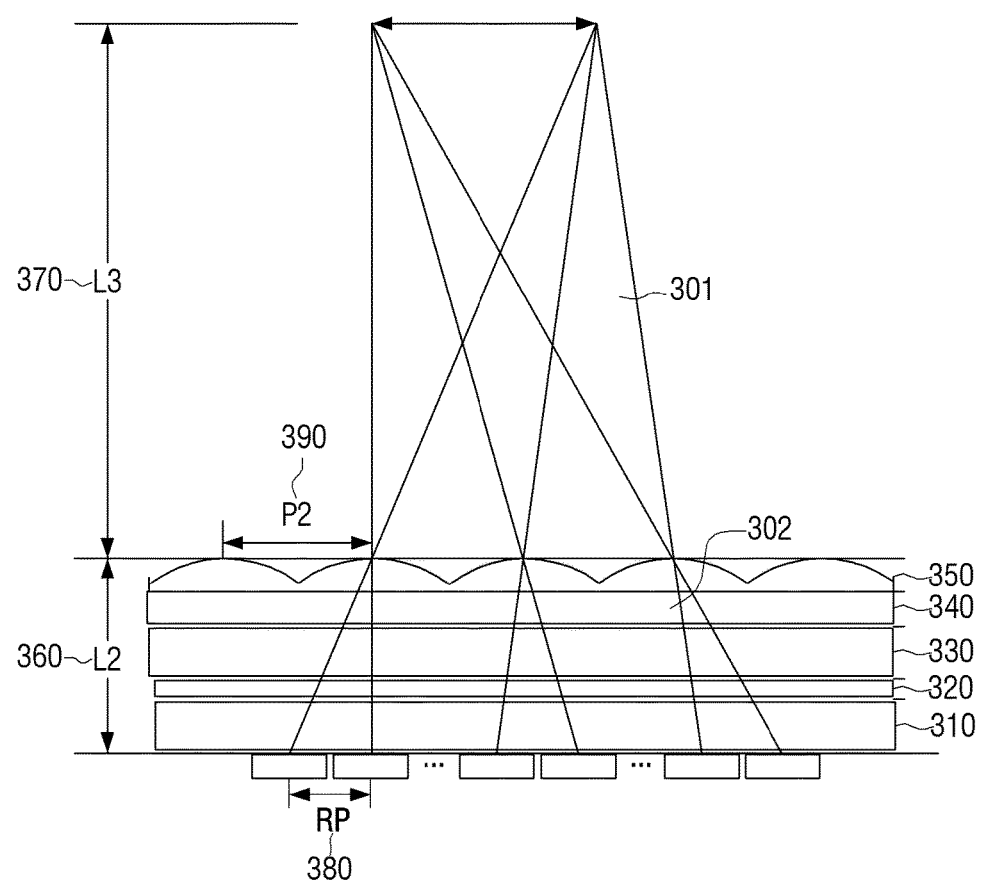
FIG. 3 is a view illustrating relationship among optical design parameters to change thickness of the parallax realization layer according to an exemplary embodiment.

FIG. 3 is a view illustrating relationship among optical design parameters to change thickness of the parallax realization layer according to an exemplary embodiment parallax realization layer.

Referring to FIG. 3, one side of a display panel 310 may include pixels, and one side of an Optically Clear Adhesive (OCA) 320 may be attached to other side of the display panel 310, and one side of a polarizing panel 330 may be attached to other side of OCA 320 and other side of the polarizing panel 330 may be attached to one side of a substrate 340, and one side of a parallax realization layer 350 may be attached to other side of the substrate 340.

Herein, a thickness L2 (360) of the display where all the display panel 310, the OCA 320, the polarizing panel 330, the substrate 340, and the parallax realization layer 350 are combined may be determined based on formula 1 as shown below.

$$L2=L3*(RP*OV-P2)/P2 \qquad \text{[Formula 1]}$$

Here, L2 (360) indicates length between a display panel and a parallax realization layer, L3 (370) indicates a distance of forming a 3D image, RP (380) indicates a rendering pitch, OV indicates an object view, and P2 (390) indicates a barrier or a lens pitch.

L2 (360), L3 (370), RP (380), OV, and P2 (390) are called optical design parameters.

L3 (370) indicates distance where 3D image is formed, which is the same as the afore-mentioned viewing distance. That is, when the parallax realization layer 350 curves a plurality of images photographed at different point of view at different angles, one eye of a user is located on the first viewing area, while another eye of a user is located in the second viewing area, and thus a user may perceive a three-dimensional effect.

Rendering pitch RP (380) is a rendering frequency to divide left and right (different views). Specifically, it means frequency when a left image and a right image are mapped in order to divide different views within an LCD Pixel. That is, the larger the rendering frequency, the more pixels will be viewed. It may be beneficial for short-distance viewing. The shorter the rendering frequency, the less pixels may be viewed, and thus may be beneficial for long-distance viewing.

In addition, when the display apparatus 200 displays a 2D image, a pixel value corresponding to the same image is input to each pixel, but if the display apparatus 200 displays a 3D image, in one pixel among neighboring pixels, the pixel value corresponding to a left-eye image is input, and in another pixel, the pixel value corresponding to a right-eye image is input.

Therefore, a rendering pitch 380, in case of 2D image, indicates distance among LCD pixels, and in case of a 3D image, indicates the distance between the pixel where the pixel value corresponding to the left-eye image is input and the pixel where the pixel value corresponding to the right-eye image is input.

Object View OV indicates the number of pupil located in the above-described viewing area. That is, if there is one viewer, there are two pupils, and thus in order to view 3D image, one eye of a user needs to be located in the first viewing area, and another eye needs to be located in the second viewing area. In this case OV is 2. Especially, the case when OV is 2 refers to a stereo view.

Therefore, if there is one viewer, OV may be 2, and if there are two viewers, OV may be 4.

P2 (390) is a barrier or a lens pitch, which is the same as the distance between above-described rendering pitch, that is LCD pixels. Accordingly, in case of a lenticular lens, a pitch of a lens in hemisphere cylinder needs to be disposed so that the pitch becomes the same as the distance between pixels composing a display panel, that is, rendering pitch.

When L2 (360), L3 (370), RP (380), OV, P2 (390) are adjusted, and based on the formula 1, L2 (360), the distance between a display panel to a parallax realization layer may be decided. Formula 1 may be calculated from proportional expression among optical design parameters.

That is, a triangle 301 with L3 (370) as height, P2 (390) as base line, and triangle 302 with length adding L3 (370) with L2 (360) as height and the value of multiplying RP (380) with the number of OV is in the proportional relation, and thus triangle proportional expression may be generated as shown below.

$$L3:(L2=L3)=P2:RP*OV \qquad \text{[Formula 2]}$$

If L2 is calculated using the triangle proportional expression, the above formula 1 can be calculated.

In particular, by changing three optical design parameters such as RP (380), OV, P2 (390), L2 (360) may be changed, so L2 (360) may be adjusted without changing L3 (370), that is, the distance where 3D image is formed or the viewing distance.

Specifically, if L2 (360) decreases, it may not necessitate that L3 (370) comparatively increase, and this implies that distance between a viewer and the display apparatus 200 may be maintained without being changed.

Accordingly, even though thickness of display becomes thinner, the distance between a viewer and the display apparatus 200 can be maintained without being changed.

L2 (360) is changeable, and thus thickness of the parallax realization layer 350 may be changed. That is, when thickness of the parallax realization layer 350 is reduced, the length of L2 (360) may be reduced.

Therefore, based on the above-described formula 1, the parallax realization layer 350 with reduced thickness may be used to unify the touch panel 330, the parallax realization layer 350, and the polarizing switch panel 340.

FIGS. 4 through 7 are views illustrating a method of the polarizing switch panel and the parallax realization layer being embedded on the touch panel according to an exemplary embodiment.

Figure 4:
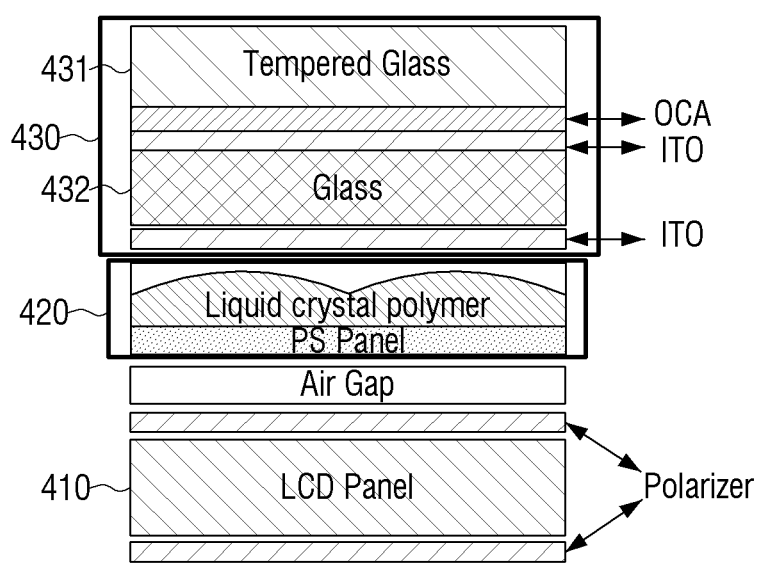
FIGS. 4, 5, 6 and 7 are views illustrating a method to describe how a polarizing switch panel and a parallax realization layer are embedded in a touch panel according to one or more exemplary embodiments.

Referring to FIG. 4, it may be noticed that the display has a structure where an LCD panel 410, an optical layer 420 that includes a polarizing switch panel and a parallax realization layer, and a touch panel 430 are layered.

Herein, the touch panel 430 indicates a GG-type touch panel including a glass layer 432 and tempered glass layer 431 that are sequentially layered, and at both sides of the glass layer 432, an ITO film is attached, and the glass layer 432 is attached to the tempered glass layer 431 by using OCA.

Indium(III) oxide (In2O3) has conductivity, but ITO adds tin dioxide (SnO2) to In2O3, to further raise conductivity. If ITO is processed with the spattering target and is spattered on a glass substrate, transparent conductive plate may be obtained. Alternatively, by solving ITO to make it sprayed on a glass substrate or soaking the glass substrate in liquid, transparent electrode film may be obtained. Coating ITO on a film such as polyethylene is called a transparent conductive film. This film is used for electrode of a luminous surface of a display EL panel, a liquid crystal panel, a transparent switch, a surface type heating element, etc.

OCA is used for attaching layers of components while making an LCD or attaching a touch screen of a cell phone, etc. As OCA penetrates 97% or more of light, functioning similarly to glass, but at the same time, it improves sharpness of a screen and has a good adhesive property compared with the former double-sided tape.

Figure 5:
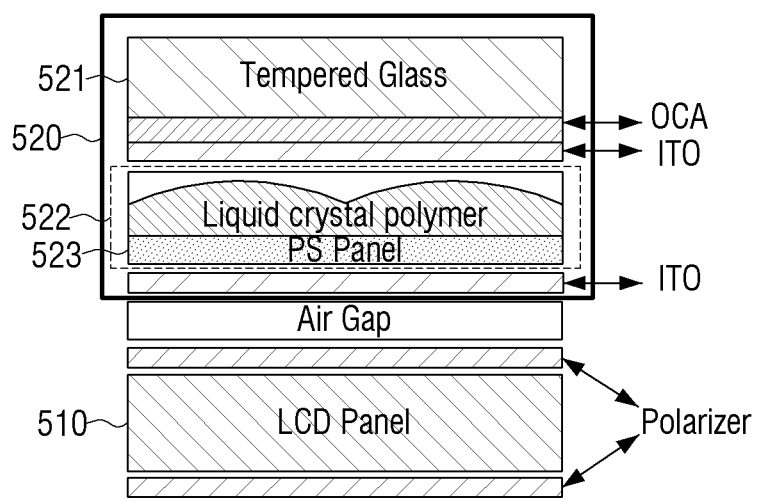

Referring to FIG. 5, a layer where the parallax realization layer with reduced thickness and a polarizing switch panel may be embedded inside a glass 522 layer of a touch panel 520.

Specifically, based on formula 1 explained with reference FIG. 3, a layer 523 where the parallax realization layer with reduced thickness and the polarizing switch panel may be embedded in the glass layer 522 of the touch panel 520.

In addition, the layer 522 where the parallax realization layer with reduced thickness and the polarizing switch panel are combined may change location and be embedded inside the tempered glass layer 521 of the touch panel 520.

That is, as shown in FIG. 4, in case of a GG-type touch panel comprising the glass layer 432 where the touch panel 430 is sequentially layered and the tempered glass layer 431, the layer where the parallax realization layer with reduced thickness and the polarizing switch panel may be embedded in the glass layer 432 of the touch panel 430 or the tempered glass layer 431.

Accordingly, in the layer where the parallax realization layer with reduced thickness and the polarizing switch panel is embedded in the glass layer 522 of the touch panel 520 or the tempered glass layer 521, compared to the structure where the LCD panel 410, the polarizing switch panel, and the optical layer 420 which includes a parallax realization layer and a polarizing switch (PS) panel, and the touch panel 430 are sequentially layered, thickness of the display decreases as much as a thickness of the optical layer 420 of the layer where the parallax realization layer and the polarizing switch panel.

Figure 6:
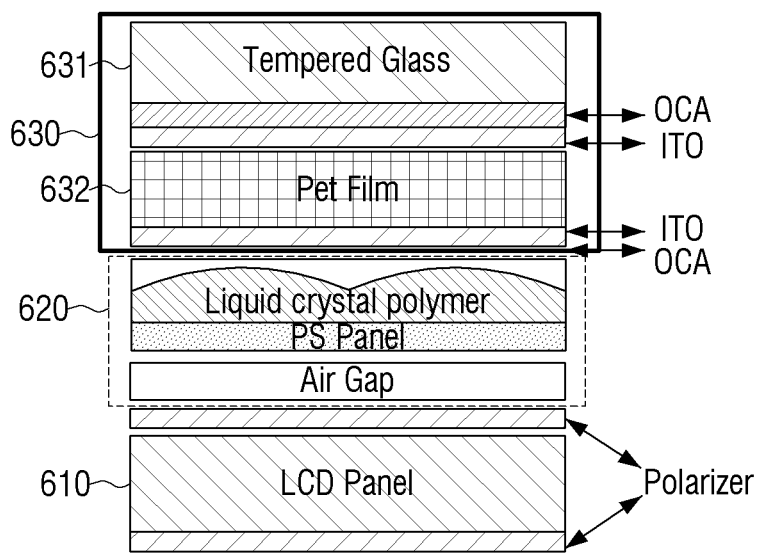

Referring to FIG. 6, the display has the structure where the LCD panel 410, the polarizing switch panel, the optical layer 420, and the touch panel 430 are layered.

Here, the touch panel 630 is a glass/film GF2-type touch panel which includes a sequentially-layered polyethylene terephthalate (PET) film 632 and the tempered glass layer 631, on the both sides of the PET film 632, the ITO film is attached, and the PET film 632 is attached to the tempered glass layer 631 by using OCA.

GF-2-type touch panel is also called the GF (glass/film) DITO (Double-sided ITO) type touch panel, which forms ITO on the both sides of a film, and thus may reduce processes and thickness of the touch panel compared to the method of using two sheets of ITO films.

As ITO and OCA are described above, further description will be omitted.

Figure 7:
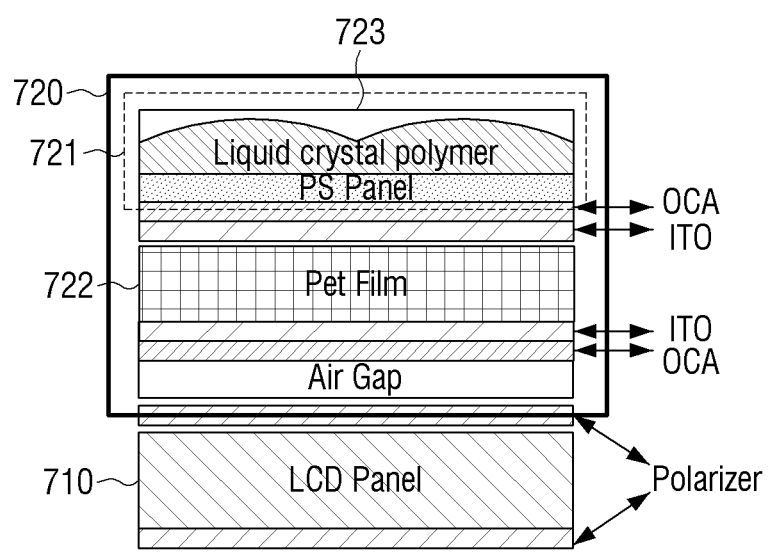

Referring to FIG. 7, it can be noticed that a layer 723 where a parallax realization layer with reduced thickness and a polarizing switch panel are combined are embedded in tempered glass layer 721 of a touch panel 720.

Specifically, based on formula 1 explained with reference to FIG. 3, the layer 723 where the parallax realization layer with reduced thickness and the polarizing switch panel may be embedded in the tempered glass layer 721 of the touch panel 720.

Accordingly, in the layer 723 where the parallax realization layer with reduced thickness and the polarizing switch panel is embedded in the tempered glass layer 721 of the touch panel 720 or the tempered glass layer 521, compared to the structure where the LCD panel 630, the optical layer 620, which includes a polarizing switch panel and the parallax realization layer, and the touch panel 630 are sequentially layered, thickness of the display decreases as much as a thickness of the optical layer 620 of the layer where the parallax realization layer and the polarizing switch panel.

In addition, the touch panel may include one glass layer or a plurality of glass layers, and the polarizing switch panel and the parallax realization layer may be embedded in the glass layer.

Specifically, when the touch panel includes one glass layer, the polarizing switch panel and the parallax realization layer may be embedded in the corresponding glass layer, and when the touch panel includes a plurality of glass layers, the polarizing switch panel and the parallax realization layer may be embedded in one glass layer among the plurality of glass layers.

In the above-described exemplary embodiment, a GG-type or GF2-type touch panel is described as an example, but the type of the touch panel is not limited to the above. Herein, the touch panel may be the type of touch panel may be GG, G1, G2, GFF, GF1, GF2, ON-CELL, and/or IN-CELL.

The video processor 210 may divide the left-eye image into a plurality of left-eye image lines, the right-eye image into a plurality of right-eye image lines, and generate the image frame by alternately combining the plurality of left-eye image lines and the plurality of right-eye image lines to minimize an area where the left-eye image and the right-eye image are mixed.

Figure 8A:
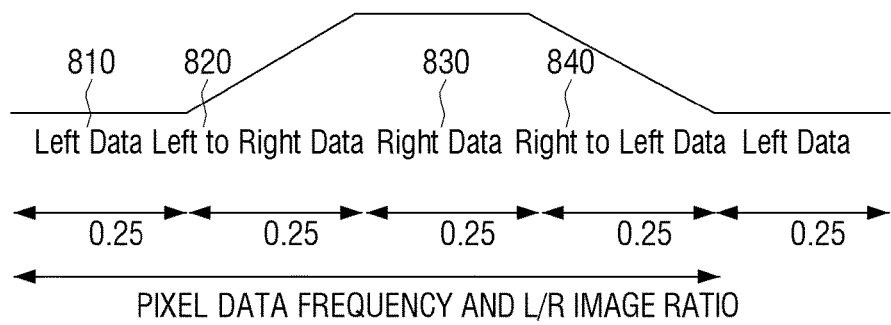
FIGS. 8A and 8B are views illustrating symmetrical and non-symmetrical left-eye/right-eye image rendering method according to an exemplary embodiment.

FIG. 8A is a view illustrating general layer structure that is the symmetric left-eye image/right-eye image rendering method which is used in the structure where the LCD panel 410, the optical layer 420 that includes the polarizing switch panel and the parallax realization layer, and the touch panel 430 are layered, as FIG. 4 or 6.

Herein, the left-eye image data section 810, the section where the left-eye image data and the right-eye image are mixed 820, the right-eye image data section 830, and the section where the right-eye image data and the left-eye image data 840 are mixed are all the same. Therefore, it is possible that the cross-talk phenomenon where the left-eye image and the right-eye image are mixed may occur, or when a viewer's position is moved, the right-eye image is projected to the left eye of the user, and the left-eye image is projected to the right eye of the user, that is the phenomenon of the image reversal.

Figure 8B:
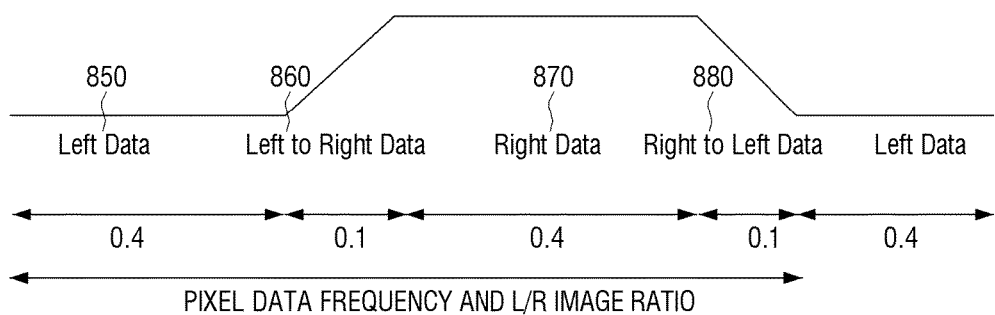

FIG. 8B according to an exemplary embodiment is a view illustrating a slim type structure, that is the non-symmetric left-eye image/right-eye image rendering method which is used in the structure where, similar to FIG. 5 or 7, the layer 523 where the parallax realization with reduced thickness and the polarizing switch panel are combined is used in the structure stored in the glass layer 522 of the touch panel 520 or the tempered glass layer 721.

Herein, the left-eye image data section 850 and the right-eye image data section 870 are maintained comparatively longer than the section 860 where the left-eye image data and the right-eye image are mixed, or the right-eye image and the left-eye image are mixed.

That is, in alternatively displaying the left-eye image and the right-eye image, by reducing frequency of data input in a pixel in the section where the left-eye image is changed to the right-eye image, or the right-eye image is changed to the left-eye image, non-symmetrical rendering of the left-eye image and the right-eye image may be available.

In addition, through non-symmetrical rendering of the left-eye image and the right-eye image, the area where the left-eye image and the right-eye image are mixed may be minimized, and the cross-talk phenomenon may be reduced.

Figure 9:
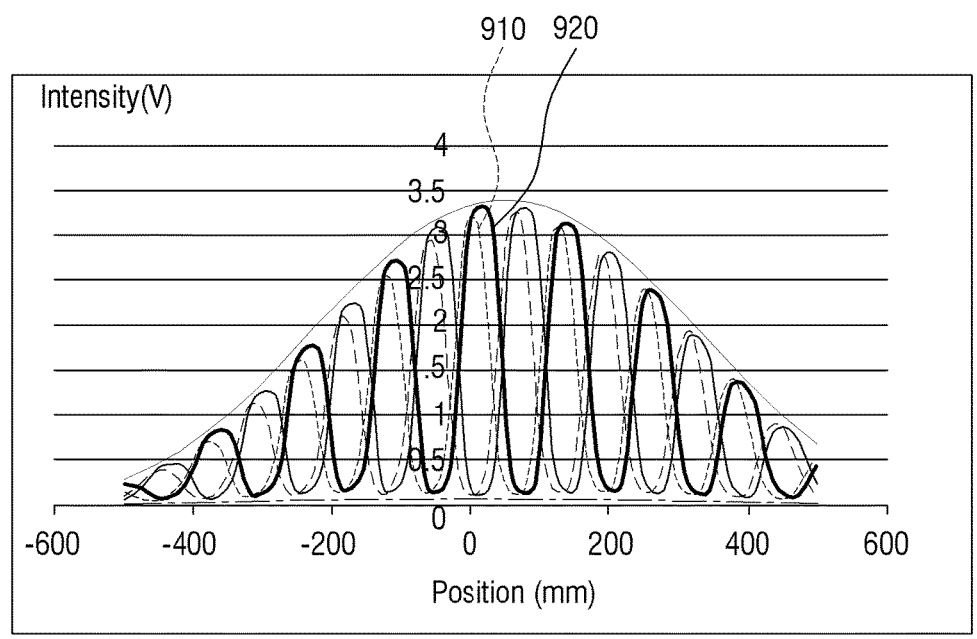
FIG. 9 is a view illustrating an optical wave based on symmetrical and non-symmetrical left-eye/right-eye image rendering method according to an exemplary embodiment.

FIG. 9 is a view according to an exemplary embodiment illustrating an optical wave in accordance with symmetric left-eye/right-eye image rendering type and left-eye/right-eye image rendering method of FIGS. 8A and 8B.

A wave 910 (dotted line) is the optical wave which is output according to symmetric left-eye/right-eye image rendering type.

In addition, a wave 920 (solid line) is the optical wave which is output according to non-symmetric left-eye-right-eye image rendering type.

Specifically, as illustrated in FIG. 8B, by reducing frequency of data input in a pixel in the section where a left-eye image changes to a right-eye image or a right-eye image changes to a left-eye image, the wave 920 becomes wider and denser than wave 910.

As the width of the wave becomes wider and denser, the effect of widening the viewing area of short-distance viewing may occur. That is, as the width of viewing area of a 3D image becomes wider, when a viewer shakes or moves the head, the user's one eye is maintained in the first viewing area, and the other eye is maintained in the second viewing area.

In addition, the area where a left-eye image and a right-eye image are mixed may be minimized, and the cross-talk phenomenon may be reduced as well.

Figure 10:
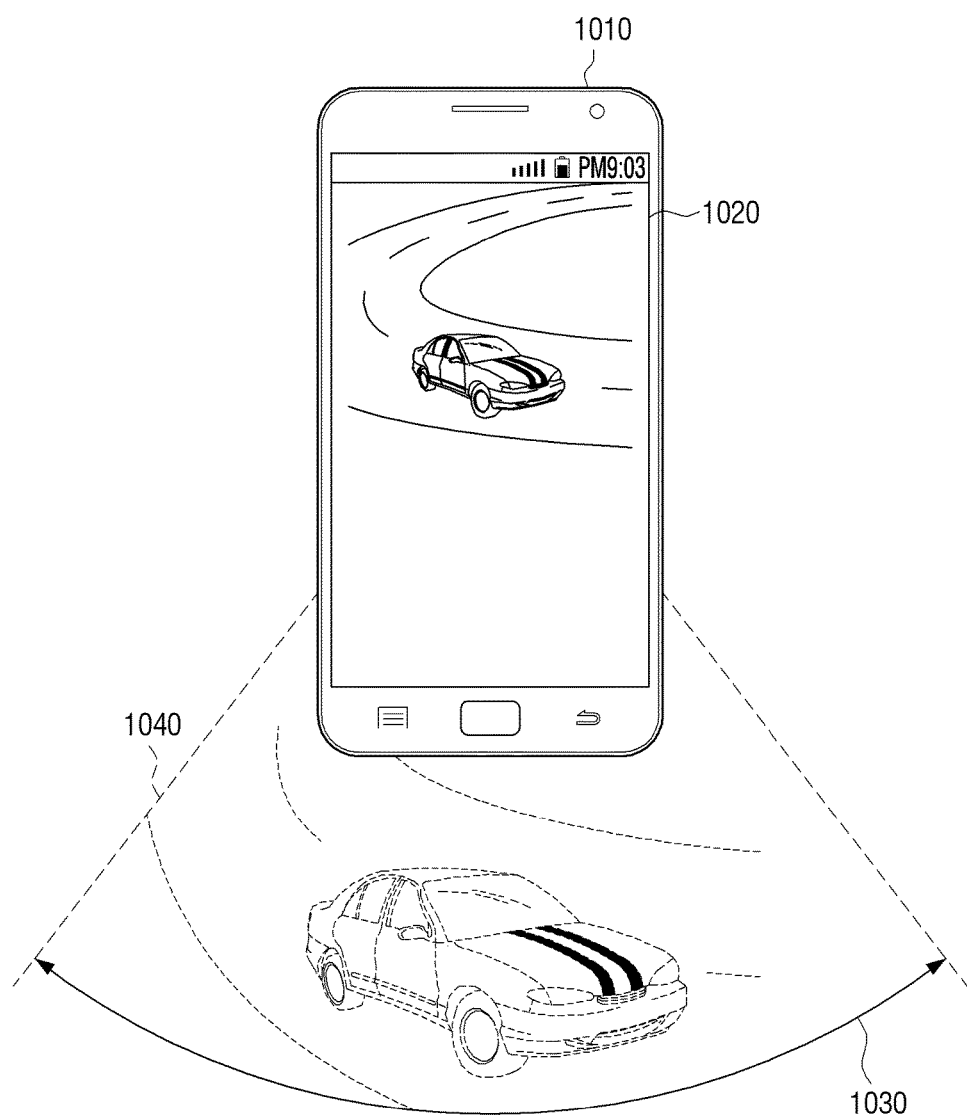
FIG. 10 is a view illustrating application within a user terminal apparatus according to an exemplary embodiment.

FIG. 10 is a view illustrating the case applied to the user terminal apparatus according to an exemplary embodiment.

The display 1020 of the user terminal apparatus 1010, as described above, may be embodied as a display panel which displays an image frame combining a right-eye image and a left-eye image, and a touch panel to sense a user touch. Herein, the touch panel may include a polarizing switch panel to switch the direction of polarization of light emitted from the display panel, and a parallax realization layer which provides a binocular disparity image by using light emitted from the polarizing switch panel, if being formed at one side of the polarizing switch panel.

As the polarizing switch panel and the parallax realization layer are embedded in the glass layer of the touch panel or the tempered glass layer, thickness of the display 1020 of the user terminal apparatus 1010 may be reduced, and further, the entire thickness of the user terminal apparatus 1010 may be reduced.

In alternately displaying a left-eye image and a right-eye image, by reducing frequency of data input in a pixel in the section where a left-eye image changes to a right-eye image, or a right-eye image changes to a left-eye image and using a rendering method of a left-eye image and a right-eye image non-symmetrically, the viewing distance 1040 and the viewing area 1030 may be expanded.

In the above-described exemplary embodiment, the descriptions were focused on EPIC (electrophoretic image display) such as an LCD, but the same principle may be applied to the self-emissive display such as an organic light emitting diode (OLED) display and a field emitting diode (FED) display.

As described above, according to the exemplary embodiment, a thickness of a 3D display apparatus without glasses equipped with at least one touch panel among various types of touch panels, for example, GG, G1, G2, GFF, GF1, GF2, ON-CELL, and IN-CELL is able to be reduced.

The foregoing embodiments and advantages are merely exemplary and are not to be construed as limiting. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display panel that comprises a liquid crystal display (LCD) panel configured to display an image frame comprising a right-eye image and a left-eye image; and
   a touch panel configured to sense a user touch,
   wherein the touch panel comprises:
      at least one glass layer;
      a polarizing switch panel disposed on the display panel, and configured to switch a direction of polarization of light that is emitted from the LCD panel included in the display panel;
      a parallax realization layer disposed on one side of the polarizing switch panel and configured to provide a binocular disparity image, based on light that is emitted from the polarizing switch panel;
      a first transparent electrode layer interposed between the display panel and the polarizing switch panel;
      a second transparent electrode layer interposed between the parallax realization layer; and
      a tempered glass layer disposed on the parallax realization layer, and
   wherein the polarizing switch panel and the parallax realization layer are embedded in the at least one glass layer.

2. The display apparatus of claim 1, further comprising:
   a video processor configured to combine the right-eye image and the left-eye image to obtain the image frame.

3. The display apparatus of claim 1, wherein a thickness of the parallax realization layer is determined by:

$$L2=L3*(RP*OV-P2)/P2,$$

where L2 indicates a length between the display panel and the parallax realization layer, L3 indicates a distance for forming a three-dimensional image, RP indicates a rendering pitch, OV indicates an object view, and P2 indicates a barrier pitch or a lens pitch.

4. The display apparatus of claim 1, wherein the touch panel is a glass-glass (GG) type touch panel comprising the at least one glass layer and the tempered glass layer disposed on the at least one glass layer, and
   wherein the polarizing switch panel and the parallax realization layer are embedded in the at least one glass layer or the tempered glass layer.

5. The display apparatus of claim 1, wherein the touch panel is a glass/film (GF2) type touch panel comprising a polyethylene terephthalate (PET) film and the tempered glass layer disposed on the PET film, and
   wherein the polarizing switch panel and the parallax realization layer are embedded in the tempered glass layer.

6. The display apparatus of claim 2, wherein the video processor is further configured to:
   divide the left-eye image into a plurality of left-eye image lines;
   divide the right-eye image into a plurality of right-eye image lines; and
   alternately combine the plurality of left-eye image lines and the plurality of right-eye image lines to minimize an area where the left-eye image and the right-eye image are mixed, to obtain the image frame.

7. The display apparatus of claim 1, wherein the touch panel comprises any one or any combination of a glass-glass (GG) type touch panel, a G1 type touch panel, a G2 type touch panel, a GFF type touch panel, a GF1 type touch panel, a glass/film (GF2) type touch panel, an ON-CELL type touch panel, and an IN-CELL type touch panel.

8. The display apparatus of claim 1, wherein the touch panel further comprises:
   a polyethylene terephthalate (PET) film interposed between the display panel and the polarizing switch panel;
   the first transparent electrode layer interposed between the display panel and the PET film; and
   the second transparent electrode layer interposed between the PET film and the polarizing switch panel.

9. The display apparatus of claim 1, wherein the parallax realization layer comprises a lenticular lens.

10. A touch panel comprising:
    at least one glass layer;
    a polarizing switch panel disposed on a display panel configured to display an image frame comprising a right-eye image and a left-eye image that are combined, the polarizing switch panel being configured to switch a direction of polarization of light that is emitted from a liquid crystal display (LCD) panel included in the display panel;
    a parallax realization layer disposed on one side of the polarizing switch panel, and configured to provide a binocular disparity image, based on light that is emitted from the polarizing switch panel;
    a first transparent electrode layer interposed between the display panel and the polarizing switch panel;
    a second transparent electrode layer interposed between the parallax realization layer; and
    a tempered glass layer disposed on the parallax realization layer,
    wherein the polarizing switch panel and the parallax realization layer are embedded in the at least one glass layer.

11. The touch panel of claim 10, wherein a thickness of the parallax realization layer is determined by:

$$L2=L3*(RP*OV-P2)/P2,$$

where L2 indicates a length between the display panel and the parallax realization layer, L3 indicates a distance for forming a three-dimensional image, RP indicates a rendering pitch, OV indicates an object view, and P2 indicates a barrier pitch or a lens pitch.

12. The touch panel of claim 10, wherein the touch panel is a glass-glass (GG) type touch panel comprising the at least one glass layer and the tempered glass layer disposed on the at least one glass layer, and wherein the polarizing switch panel and the parallax realization layer are embedded in the at least one glass layer or the tempered glass layer.

13. The touch panel of claim 10, wherein the touch panel is a glass/film (GF2) type touch panel comprising a polyethylene terephthalate (PET) film and the tempered glass layer disposed on the PET film, and wherein the polarizing switch panel and the parallax realization layer are embedded in the tempered glass layer.

14. A method of displaying an image frame with a perceived three-dimensional effect, the method comprising:

displaying, by a display panel, the image frame comprising a right-eye image and a left-eye image;

switching, by a polarizing switch panel embedded in at least one glass layer of a touch panel, a direction of polarization of light that is emitted from a liquid crystal display (LCD) panel included in the display panel; and providing, by a parallax realization layer embedded in the at least one glass layer of the touch panel, a binocular disparity image frame, based on light that is emitted from the polarizing switch panel, wherein the touch panel comprises:

a first transparent electrode layer interposed between the display panel and the polarizing switch panel; and a second transparent electrode layer interposed between the parallax realization layer and a tempered glass layer disposed on the parallax realization layer.

* * * * *